(12) United States Patent
Joshi et al.

(10) Patent No.: US 11,092,078 B2
(45) Date of Patent: *Aug. 17, 2021

(54) TUNABLE RESONATOR

(71) Applicant: PRATT & WHITNEY CANADA CORP., Longueuil (CA)

(72) Inventors: Ninad Joshi, Brampton (CA); Sid-Ali Meslioui, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 105 days.

This patent is subject to a terminal disclaimer.

(21) Appl. No.: 16/202,317

(22) Filed: Nov. 28, 2018

(65) Prior Publication Data
US 2019/0093565 A1    Mar. 28, 2019

Related U.S. Application Data

(62) Division of application No. 15/605,051, filed on May 25, 2017, now Pat. No. 10,167,780.

(51) Int. Cl.
*F02C 7/24* (2006.01)
*F01N 1/02* (2006.01)
(Continued)

(52) U.S. Cl.
CPC .................. *F02C 7/24* (2013.01); *F01N 1/02* (2013.01); *F01N 1/023* (2013.01); *F01N 1/026* (2013.01); *F01N 1/085* (2013.01); *F01N 1/089* (2013.01); *F01N 1/161* (2013.01); *F01N 3/36* (2013.01); *F02C 3/04* (2013.01); *F02C 9/18* (2013.01); *F23M 20/005* (2015.01); *F05B 2260/96* (2013.01); *F05B 2260/964* (2013.01); *F05D 2220/32* (2013.01); *F05D 2240/35* (2013.01); *F05D 2260/96* (2013.01);
(Continued)

(58) Field of Classification Search
CPC .......... F01N 1/026; F01N 1/089; F01N 1/161; F02C 7/04; F02C 7/24; F02K 1/00; F05B 2260/964; F05D 2260/96; F05D 2260/963; F23M 20/005; F23R 2900/00001; F23R 2900/00013; F23R 2900/00014

See application file for complete search history.

(56) References Cited

U.S. PATENT DOCUMENTS 3,611,724 A    10/1971    Kutney
6,508,331 B1    1/2003    Stuart
(Continued)

FOREIGN PATENT DOCUMENTS

DE    19640980    4/1998
JP    11044266    2/1999
WO    WO-2014173660 A1 *  10/2014  ................ F23R 3/28

*Primary Examiner* — Scott J Walthour
(74) *Attorney, Agent, or Firm* — Norton Rose Fulbright Canada LLP (57) ABSTRACT

The gas turbine engine includes a fluid system fluidly connecting at least two components of the gas turbine engine, and a tunable resonator in fluid flow communication with the fluid system. The tunable resonator has a resonating volume that varies as a function of a volume of an inflatable member located inside the tunable resonator. The inflatable member having a means for varying the volume of the inflatable member, to thereby tune the resonating volume to a selected frequency of pressure fluctuations or acoustic waves within the fluid system.

15 Claims, 4 Drawing Sheets

(51) Int. Cl.
  *F01N 1/08*   (2006.01)
  *F01N 1/16*   (2006.01)
  *F02C 3/04*   (2006.01)
  *F23M 20/00*  (2014.01)
  *F02C 9/18*   (2006.01)
  *F01N 3/36*   (2006.01)
  *F23R 3/00*   (2006.01)

(52) U.S. Cl.
  CPC ........ *F05D 2260/963* (2013.01); *F23R 3/002* (2013.01); *F23R 2900/00001* (2013.01); *F23R 2900/00005* (2013.01); *F23R 2900/00013* (2013.01); *F23R 2900/00014* (2013.01)

(56) References Cited

U.S. PATENT DOCUMENTS

| | | | |
|---|---|---|---|
| 6,948,479 B1 * | 9/2005 | Raney | F15B 1/021 |
| | | | 123/456 |
| 7,195,210 B2 | 3/2007 | Hamilton et al. | |
| 8,915,329 B1 | 12/2014 | Hermiller et al. | |
| 8,991,769 B2 | 3/2015 | Gandhi | |
| 9,415,856 B2 | 8/2016 | Rawdon et al. | |
| 9,457,887 B2 | 10/2016 | Roe et al. | |
| 10,167,780 B2 * | 1/2019 | Joshi | F02C 9/18 |
| 2002/0000343 A1 | 1/2002 | Paschereit et al. | |
| 2016/0076766 A1 | 3/2016 | Jayatunga | |

* cited by examiner

TUNABLE RESONATOR

CROSS-REFERENCE TO RELATED APPLICATIONS

The present application is a divisional of U.S. patent application Ser. No. 15/605,051 filed May 25, 2017, the entire content of which is incorporated herein by reference.

TECHNICAL FIELD

The application relates generally to gas turbine engine fluid systems and, more particularly, to resonators used to attenuate or dump pressure fluctuations or acoustic waves in such fluid systems.

BACKGROUND

Gas turbine engines are operated over a wide range of operating conditions and are required to handle various flow conditions during operation. The fluid-structure-acoustic interactions that occur in fluid systems of such engines can exhibit resonances or pressure fluctuations resulting in undesirable consequences, such as noise generation, vibratory stresses, etc. The amplitude and frequency of the excitation or the undesirable noise vary with a number of parameters, including the operating and/or flow conditions, and configuration of the related components of the fluid systems.

Resonators have been used to mitigate the noise and associated stress on the affected components. A conventional single resonator design is tuned to a specific target frequency, and therefore it is effective but only over a narrow range of frequencies. However, the target frequency of the generate noise can sometimes change quite significantly with engine power or varied operating and/or flow conditions. Hence, in an effort to attenuate or dump pressure fluctuations or acoustic waves over a range of frequencies, several customized resonators can sometimes be required to cover those frequencies, thereby adding undesirable cost and weight to the engine.

SUMMARY

There is accordingly provided a tunable resonator for damping at least one selected frequency of pressure fluctuations or acoustic waves within a fluid system of a gas turbine engine, the tunable resonator comprising: an outer casing enclosing a chamber defining a total inner volume and having an inlet therein configured to provide fluid flow communication between the chamber and the fluid system, the outer casing defining an axial direction and a radial direction; and an inflatable member disposed within the outer casing adjacent at least one inner wall of the outer casing, the inflatable member having a skin defining a sub-chamber within the chamber, the skin configured to prevent fluid flow between the sub-chamber and the chamber, the skin being deformable between a deflated position and one or more inflated positions to change a volume of the sub-chamber; wherein a resonating volume of the tunable resonator corresponds to a difference between the total inner volume of the chamber and the volume of the sub-chamber.

There is also provided a gas turbine engine comprising, in serial flow communication, a compressor, a combustor, and a turbine, the gas turbine engine further having a fluid system fluidly connecting at least two components of the gas turbine engine and including a tunable resonator in fluid flow communication with the fluid system, the tunable resonator defining an axial direction and a radial direction, the tunable resonator having a resonating volume that varies as a function of a volume of an inflatable member located inside the tunable resonator, the inflatable member having a means for varying the volume, the inflatable member thereby tuning the resonating volume to a selected frequency of pressure fluctuations or acoustic waves within the fluid system.

There is further provided a method for tuning a resonator in a fluid system of a gas turbine engine, the method comprising: determining a frequency of pressure fluctuations or acoustic waves occurring in the fluid system; determining a required resonating volume of the resonator fluidly connected to the fluid system for damping the pressure fluctuations or acoustic waves; and changing a resonating volume of the resonator by deforming one or more walls of an inflatable member until the resonating volume corresponds to the required resonating volume.

BRIEF DESCRIPTION OF THE DRAWINGS

Reference is now made to the accompanying figures in which:

FIG. 4a is a schematic front view of a portion of a skin of the inflatable member of FIG. 3a; and FIG. 4b is a schematic cross-sectional view taken along line 4b-4b on FIG. 4a.

DETAILED DESCRIPTION

Figure 1:
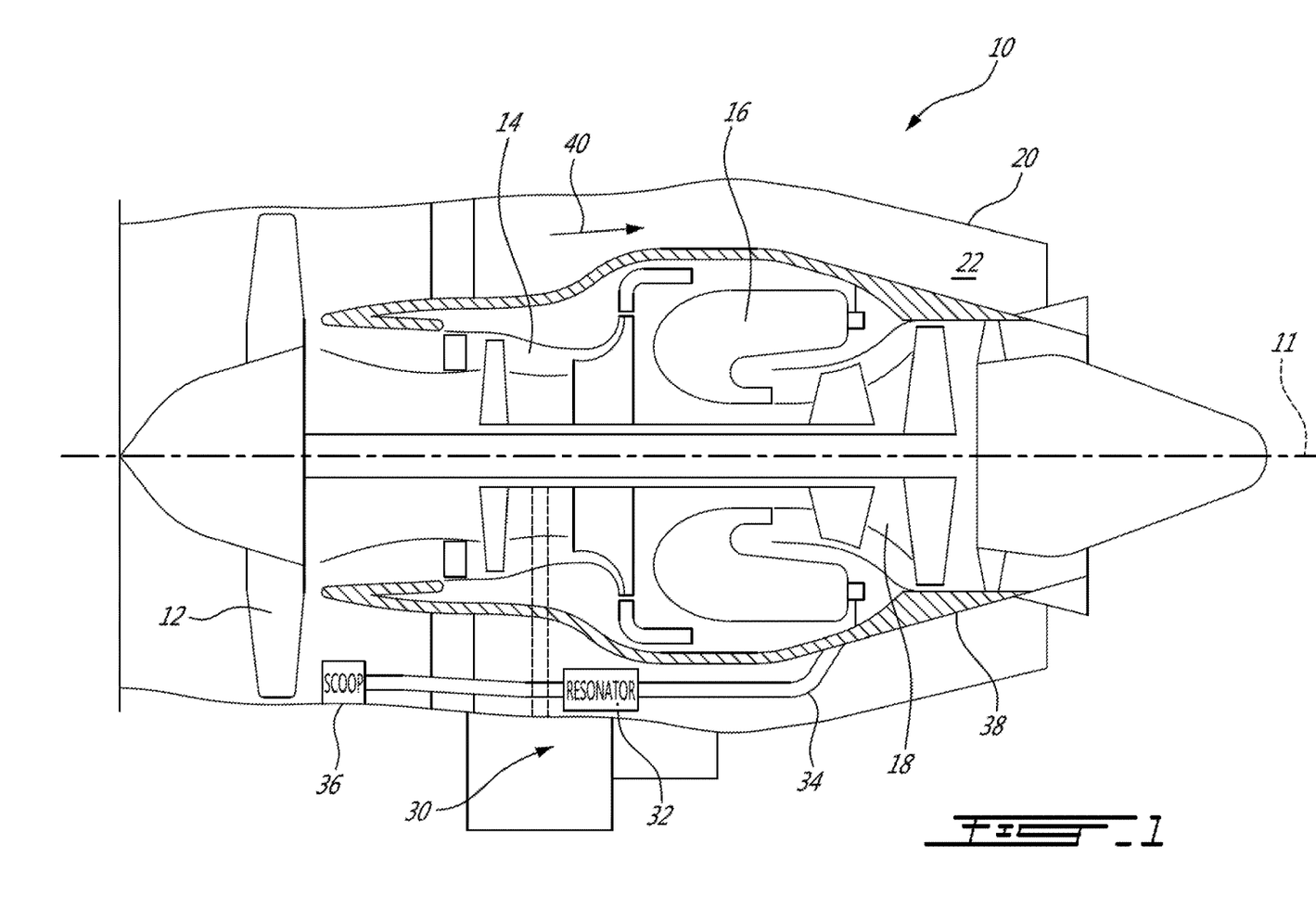
FIG. 1 is a schematic cross-sectional view of a gas turbine engine.

FIG. 1 illustrates a gas turbine engine 10 of a type preferably provided for use in flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The gas turbine engine further comprises a case 20 defining an annular by-pass conduit 22 surrounding the compressor 14, the combustor 16, and the turbine 18. Although the engine 10 is shown as a turbofan, the disclosure of the present application may be applied to other types of engines, such as, but not limited to, turboprops and turboshafts.

The gas turbine engine 10 further has a fluid system 30. The fluid system 30 may be used to direct air between two components. Such fluid systems 30 may include, but are not limited to, air, oil, fuel and/or hydraulic systems of the engine. Additionally, the resonators as described herein may also be used to reduce structural damage due to pressure pulses from vane pumps or to reduce surges due to opening/closing of valves. In certain operating and/or flow conditions, the air or fuel lines or ducts of the fluid system 30 can exhibit high pressure fluctuations caused by, for example only, pumps, valves, vortices, etc., and which may be directly or indirectly responsible for the generation of unwanted noise. In some cases, resonance can occur at a given frequency. Such pressure fluctuations and/or acoustic waves causing noise generation can be of the fluid-acoustics interaction in the cavities or pipes of the system, which can sometimes lead to the cavities or pipes entering into resonances, or causing fluid-structure-acoustic interactions where the noise or acoustic excitation is sustained thereby causing high stress on the related components.

In the illustrated embodiment, a resonator 32 in fluid communication with the fluid system 30 is used to dampen one or more selected frequencies of pressure fluctuations or acoustic waves occurring in the fluid system 30. The resonator 32 typically comprises a resonating volume that is pre-selected to dampen the pressure fluctuations or acoustic waves. The more generic term "vibrations" may also be used herein to refer to such pressure fluctuations and/or acoustic waves occurring in the fluid.

Still referring to FIG. 1, the fluid system 30 comprises a conduit 34 fluidly connecting at least two components of the gas turbine engine 10. In the illustrated embodiment, the two components are a scoop 36 and a case 38 of the turbine section 18 requiring cooling. The scoop 36 is used to bleed air from the annular by-pass conduit 22, downstream of the fan 12 relative to an annular flow 40 circulating in the by-pass conduit 22. The bled air may be used to cool the turbine case 38. The resonator 32 is affixed to the conduit 34, between the scoop 36 and the turbine case 38. The resonator 32 is hence fluidly connected to the conduit 34. It is however understood that the use of the disclosed fluid system 30 and the arrangement disclosed herein are only one of many possible arrangements and uses.

As aforementioned, the resonator 32 can only dampen one frequency, or a narrow range of frequencies, and may therefore become purposeless when the given frequency shifts. The reasons for such a shift are typically a change in the operating conditions of the gas turbine engine 10. In a particular embodiment, the operating conditions are the outside temperature—which can vary by approximately 200 degrees Fahrenheit—a thrust level of the gas turbine engine 10, the rotational speed of a component of the engine (e.g. compressor 14 and turbine 18, and more particularly one or more of the Low Pressure (LP) shaft, the High Pressure (HP) shaft and/or the Intermediate Pressure (IP) shaft), a mass flow rate in the fluid system 30, and/or pressure ratios in the fluid system 30. Other factors may also influence the frequency, including altitude. Therefore, to cater to the different possible frequencies, it may become necessary to add more resonators to the fluid system 30, which adds weight to the engine 10.

One option to tune the resonator 32 to dampen pressure fluctuations and/or acoustic waves occurring at another frequency is to vary its resonating volume. By doing so, the frequency of the pressure fluctuations and/or acoustic waves that the resonator is adapted to dampen can be varied in function of the operating conditions of the gas turbine engine 10. The resonator 32 may be a Helmholtz resonator 100 and an in-line resonator 200, or any derivatives and/or combinations thereof, both of which are discussed in further details herein below.

Figure 2A:
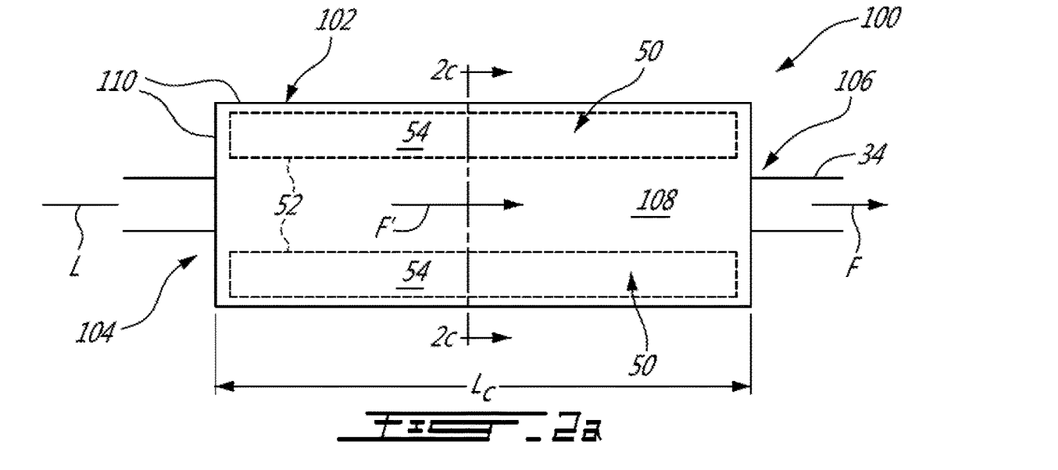
FIG. 2a is a schematic cross-sectional view of a tunable resonator in accordance with a particular embodiment.

Now referring to FIG. 2a, in the in-line resonator 100, the flow F' circulating therein is parallel to a flow F circulating in the conduit 34 of the fluid system 30. The resonator 100 has an outer casing 102 of a length Lc longitudinally extending along an axis L extending parallel to the conduit 34. The outer casing 102 has an inlet 104 and an outlet 106. The inlet 104 and the outlet 106 are fluidly connected to the conduit 34 of the fluid system 30. The outer casing 102 encloses a chamber 108 that has an inner volume. In such a case, a resonating volume of the resonator 100 corresponds to the inner volume of the chamber 108.

Figure 2B:
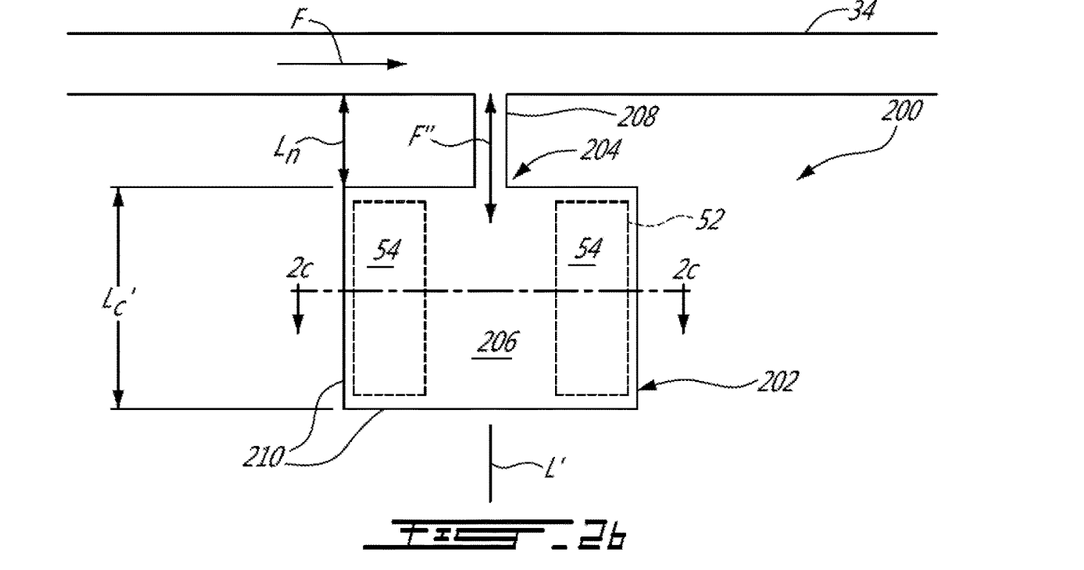
FIG. 2b is a schematic cross-sectional view of a tunable resonator in accordance with a particular embodiment.

Now referring to FIG. 2b, in the Helmholtz resonator 200, the flow F circulating in the conduit 34 is perpendicular to the flow F'' circulating in the resonator 200. The resonator 200 has an outer casing 202 of a length Lc' longitudinally extending along an axis L' extending perpendicularly to the conduit 34. The outer casing 202 has a combined inlet and outlet 204 configured to be fluidly connected to the conduit 34 of the fluid system 30. In the illustrated embodiment, the resonator outer casing 202 encloses a chamber 206 that has an inner volume. Similarly to the embodiment depicted in FIG. 2a, a resonating volume of the resonator 200 corresponds to the volume of the chamber 206. The resonator 200 further comprises a neck 208 of a length Ln extending along the axis L'. The neck 208 has a given cross-sectional area. The neck 208 fluidly connects the chamber 206 to the fluid conduit 34.

Referring concurrently to FIGS. 2a and 2b, the frequency of the pressure fluctuations and/or acoustic waves that the resonator 100 or 200 is adapted to dampen is function of a plurality of geometric parameters, such as, but not limited to, the speed of sound, the resonating volume, the cross-sectional area of the neck 208, and the length Ln of the neck 208. Hence, as aforementioned, by modifying the resonating volume it is possible to tune the resonator 100/200 to dampen pressure fluctuations and/or acoustic waves occurring at another frequency without changing its geometric characteristics. In the illustrated embodiment, an inflatable member 50 is used for that purpose.

Figure 2C:
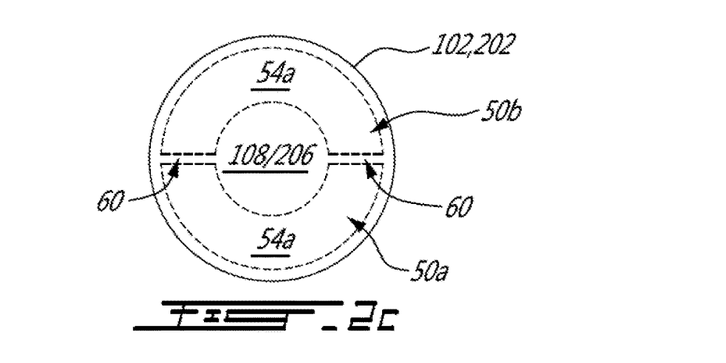
FIG. 2c is a cross-sectional view taken along line 2c-2c of FIGS. 2a and 2b.

Referring also to FIG. 2c, the inflatable member 50 is inserted in the outer casing 102/202 of the resonator 100/200. In the illustrated embodiment, the inflatable member 50 is adjacent inner walls 110/210 of the outer casing 102/202. The inflatable member 50 has a skin 52 defining a sub-chamber 54 therewithin. The skin 52 prevents fluid communication between the chamber 108/206 and the sub-chamber 54. The skin 52 of the inflatable member 50 is deformable between a deflated position and one or more inflated positions. The deflated position of the inflatable member 50 has a deflated volume. In a particular embodiment, the deflated volume is negligible such that the resonating volume corresponds to the total inner volume of the chamber 108/206. More details regarding the deformation of the inflatable member 50 are provided herein below.

By providing the inflatable member 50 inside the chamber 108/206 of the outer casing 102/202, the resonating volume may be varied. The resonating volume thereby corresponds to a difference between the volume of the chamber 108/206 and the volume of the sub-chamber 54.

Referring more particularly to FIG. 2c, the inflatable member 50 may comprise two sub-members 50a and 50b each extending along half a perimeter of the outer casing 102/202 and enclosing a respective sub-chamber 54a/b. In the illustrated embodiment, each of the two sub-members 50a/b takes the form of a half of a cylinder. The two sub-members 50a/b are disposed to abut against one another along abutting walls 60 thereof such that the inflatable sub-members 50a/b take the form of a cylinder. In a particular embodiment, the inflatable member 50 comprises one sub-member. The inflatable member 50 may comprise more than two sub-members. The sub-members 50a/b may be axially and/or radially deformable to vary the volume of the sub-chamber 54a/b and hence the resonating volume. Accordingly, the resonating volume varies inversely to the volume of the sub-chambers 54a/b. This aspect is discussed below. The inflatable sub-member 50a is described in further detail below. It is understood that the characteristics of the sub-member 50a may be the same for the sub-member 50b.

Figure 3A:
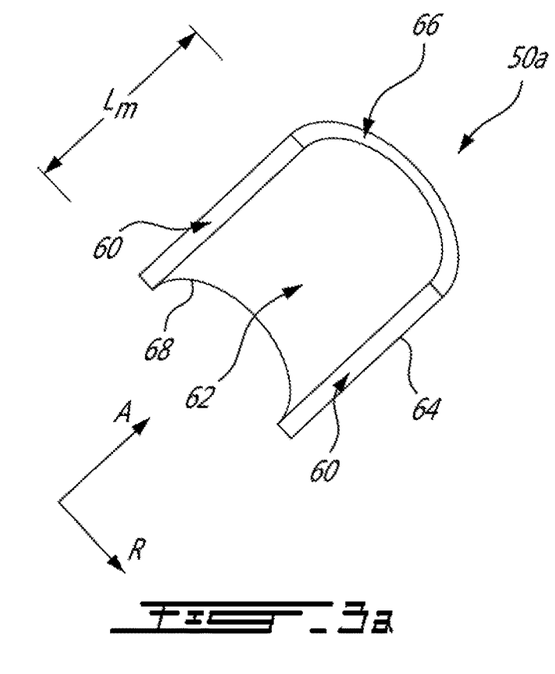
FIGS. 3a to 3d are schematic tridimensional views of an inflatable member of the tunable resonators of FIGS. 2a to 2c, the inflatable member is shown in different inflated positions.

Referring now to FIG. 3a, the skin 52 of the inflatable sub-member 50a is shaped to define half a cylinder having a radially-inner wall 62, a radially-outer wall 64, an annular proximal wall 66, and an annular distal wall 68. In a particular embodiment, the radially-outer wall 64 is affixed to the inner wall 110/210 of the outer casing 102/202. Although the inflatable member 50a has been depicted as cylindrical, it is understood that other shapes may be used without departing from the scope of the present disclosure.

Referring now to FIGS. 3a to 3d, the inflatable sub-member 50a changes the volume of its sub-chamber 54a by expansion/retraction along an axial direction A and/or a radial direction R. The inflatable member in a deflated position is schematically illustrated in FIG. 3a. In a particular embodiment, the two sub-members 50a and 50b can be simultaneously or independently inflatable relative to one another.

Figure 3B:
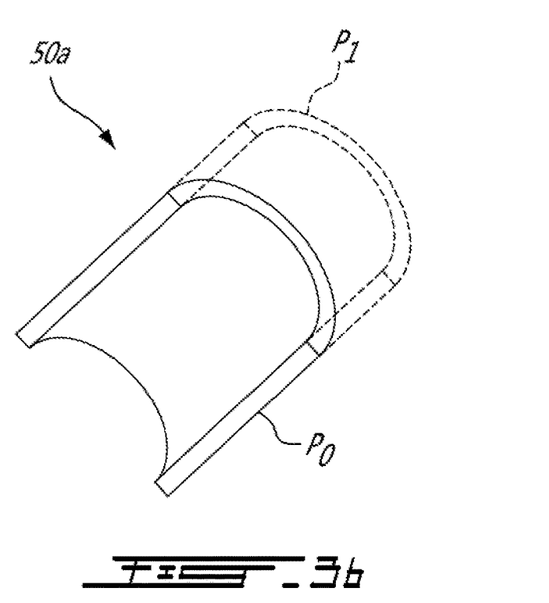

Referring more particularly to FIG. 3b, in one embodiment, the inflatable sub-member 50a changes the resonating volume by expansion/retraction along the axial direction A. In the illustrated embodiment, the inflatable sub-member 50a longitudinally extends from the deflated position P0 to one inflated position P1 illustrated in dashed lines. When the inflatable sub-member 50a is inserted in the chamber 108/206 of the resonator 100/200, its length Lm increases or decreases. For the in-line resonator 100 of FIG. 2a, the length Lm extends parallel to the flow F that circulates in the fluid conduit 34 of the fluid system 30. For the Helmholtz resonator 200, the length Lm extends perpendicularly to the flow F. In the illustrated embodiment, the sub-member 50a can expand until both the proximal and distal annular walls 66 and 68 abut against the inner walls 110/210 of the outer casing 102/202.

Figures 3C, 3D:
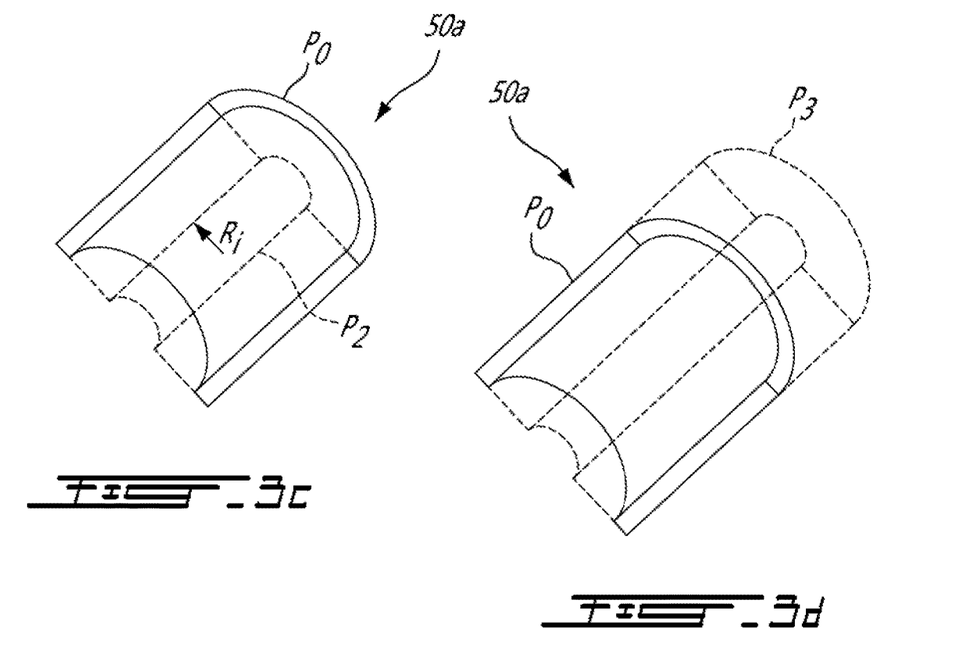

Referring more particularly to FIG. 3c, the inflatable sub-member 50a changes the resonating volume by expansion/retraction along the radial direction R. The inflatable sub-member 50a is deformable between the deflated position P0 and another inflated position P2 illustrated in dashed lines. The inflatable sub-member 50a may cover only a portion of the length Lc of the outer casing 102/202.

In a particular embodiment, the inflatable sub-member 50a can expand until the radially-outer wall 64 abuts against the inner walls 110/210 of the outer casing 102/202 and until an inner radius Ri of the radially-inner wall 62 becomes substantially negligible. In the case of the in-line resonator 100, the inflatable member 50 may therefore be configured as a valve adapted to block the flow in the fluid conduit 34 of the fluid system 30.

Now referring to FIG. 3d, the inflatable sub-member 50a changes the resonating volume by expansion/retraction along both the radial R and axial A directions. The inflatable member 50 is therefore deformable between the deflated position P0 and an inflated position P3 also illustrated in dashed lines. Similarly to the embodiment depicted in FIG. 3c, the sub-member 50a may be configured to block the flow circulating in the fluid conduit 34 of the fluid system 30. In the illustrated embodiment, the sub-member 50a can expand until both the proximal and distal annular walls 66 and 68 abut against the inner walls 110/210 of the outer casing 102/202.

In the illustrated embodiments, the resonating volume is greater when the inflatable member 50 is in the deflated position P0 than when the inflatable member 50 is in any of the depicted inflated positions P1, P2, and P3.

To be able to move from the deflated position to any of the inflated positions, the inflatable member 50 has a mean to vary the volume of its sub-chamber 54. One of the possible means is discussed below. In a particular embodiment, the mean would be similar to the morphing materials disclosed in U.S. Pat. No. 9,415,856, the entire content of which is enclosed herein by reference. The inflatable member 50 may comprise ribs whose positions are changed with an actuator to change the shape and the volume of the sub-chamber 54.

In a particular embodiment, the mean would be similar to the layer of fibers disclosed in U.S. Pat. No. 7,195,210, the entire content of which is enclosed herein by reference. The skin 52 of the inflatable member 50 may comprise the layer of fibers embedded therein. The fibers comprise a first set of fibers extending in a first direction and a second set of fibers extending in a second direction. The first and second directions defining an angle that is variable with a change of volume of the sub-chamber 54.

In a particular embodiment, the mean would be similar to the morphing structure disclosed in U.S. Pat. No. 8,991,769, the entire content of which is enclosed herein by reference. The inflatable member 50 may comprise the morphing structure adjacent the skin 52. The morphing structure includes a plurality of morphing elements. Each morphing element comprises four rigid members. Both ends of each of the rigid members are pivotally mounted to and end of another rigid members using hinges thereby forming a closed figure (e.g. square). The morphing structure further comprises two springs. Each spring is attached to two opposed hinges such that an angle between two consecutive rigid members is 90 degrees when no force is exerted on the morphing element. The angle variable with a change of volume of the inflatable member.

In another particular embodiment, the mean would be similar to the smart material disclosed in U.S. Pat. No. 9,457,887, the entire content of which is enclosed herein by reference. The skin 52 of the inflatable member may be made of the smart material, or be affixed to the smart material. The smart material is capable of changing its shape through application of a stimulus. The stimulus may be light, heat, electric voltage/current, magnetic fields, pressure variation, and a combination thereof. The smart material may be piezoelectric composites, electro-active polymers, shape memory alloys, and carbon nanotube composites. In yet another particular embodiment, a portion of the skin 52 of the inflatable member 50 is made of a shape memory composite and/or polymer, a fiber-reinforced composite with a shape-memory polymer, a syntactic foam with microspheres in an epoxy resin, and/or a morphing metallic foil. In a particular embodiment, the skin 52 is disposed adjacent a structure made of the above listed materials.

Figure 4A:
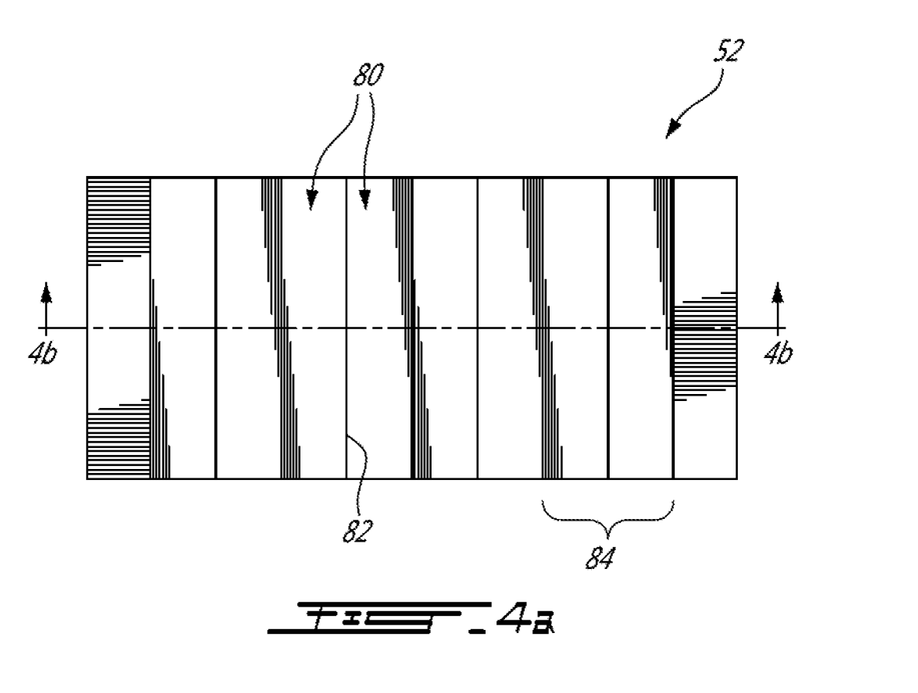
Figure 4B:
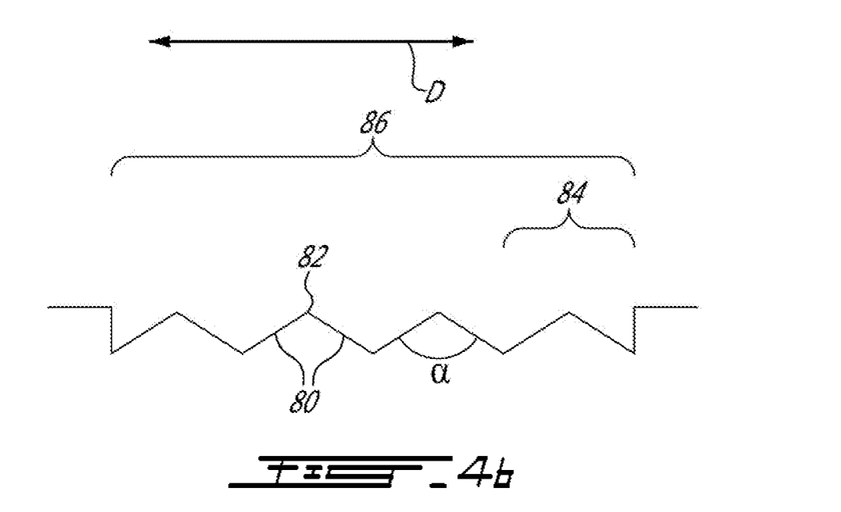

Now referring to FIGS. 4a and 4b, a portion of the skin 52 of the inflatable member 50 has a plurality of panels 80. Two successive panels 80 are pivotable relative to one another along an edge 82 joining the two panels 80 to define a gusset 84. In the illustrated embodiment, the edge 82 is deformable. In a particular embodiment, the edge 82 is a hinge joining the two successive panels 80. In the illustrated embodiment, the skin 52 comprises a plurality of gussets 84 to define an accordion section 86 of the inflatable member skin 52.

Referring more particularly to FIG. 4b, the two successive panels 80 define an angle α that is variable in function of the volume of the sub-chamber 54 of the inflatable member 50. In the illustrated embodiment, the angle α varies from 0 degree, in the deflated position P0 (see FIG. 3), to 180 degrees in a fully inflated position. The direction of elongation D is therefore perpendicular to the edges 82. The walls 60, 62, 64, 66, and 68 that require deformation to allow axial and/or radial expansion/retraction of the inflatable member 50 are provided with the above described gussets 84. In a particular embodiment, the walls are provided with the alternate means that have been described hereinabove.

In a particular embodiment, the skin 52 comprises a plurality of building blocks arranged in a lattice to give morphing properties to the skin 52 of the inflatable member 50. One of the building blocks may comprise the structure illustrated on FIGS. 4a and 4b. The skin 52 may be made of advanced composites, plastics, resins, polymers (e.g. neoprene-rubber), metals, and a combination thereof.

The frequency of the pressure fluctuations and/or acoustic waves that the resonator 100/200 is adapted to dampen may increases with a decrease in the resonating volume. In this case, the smaller the resonating volume, the greater is the frequency of the pressure fluctuations and/or acoustic waves that the resonator 100/200 is adapted to dampen. In other words, the greater the volume of the sub-chamber 54 of the inflatable member 50, the greater is the frequency of pressure fluctuations and/or acoustic waves that the resonator 100/200 is adapted to dampen.

For tuning the resonator 100/200, the frequency at which the fluid system 30 oscillates, i.e. due to the pressure fluctuations and/or acoustic waves, is determined. This may be done either experimentally or by numerical analysis using computational fluid dynamics, for example. A required resonating volume for a range of operation and/or flow conditions is then computed. The resonating volume is then changed by deforming one or more walls 60, 62, 64, 66, and 68 of the inflatable member 50 until the resonating volume corresponds to the required resonating volume.

For the Helmholtz resonator 200, the required resonating volume is function of the frequency (fh) of the fluid system 30, the speed of sound (v), the cross-sectional area (A) of the neck 208 fluidly connecting the resonator 200 to the fluid system 30, and the length (Ln) of the neck 208. In a particular embodiment, the required resonating frequency is determined by the equation, in its simpler form:

$$f_H = \frac{v}{2\pi}\sqrt{\frac{A}{V_0 L_{eq}}}$$

For the in-line resonator 100, and in accordance with a particular embodiment, the required dimensions are determined by a complex function of the chamber length Lc, element lengths, and the expansion ratio of the resonator.

In a particular embodiment, changing the resonating volume comprises changing the angle α between the two sections 80 of at least one gusset 84 of the skin 52 of the inflatable member 50. In the illustrated embodiment, the inflatable member 50 is inflated using compressed air from the compressor 14 of the engine.

In a particular embodiment, a controller (not shown) is used to monitor changes in the frequency. Therefore, the controller comprises a frequency determining volume. The controller may be the engine control system. The controller may further comprise an inflatable member controlling module for controlling the inflation/deflation of the inflatable member 50.

In a particular embodiment, a trigger to initiate deflation or inflation of the inflatable member 50 is a change in a flow parameter of the fluid system 30. The flow parameters may be the ambient temperature, the rotational speed of a component of the gas turbine engine 10, a thrust level of the engine 10, a mass flow rate in the fluid system, and/or a pressure ratio in the fluid system 30.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine comprising:
a fluid passage fluidly connecting at least two components of the gas turbine engine;
a tunable resonator, the tunable resonator being an in-line resonator, the tunable resonator comprising:
an inlet connected to the fluid passage and configured to receive fluid from an upstream portion of the fluid passage;
an outlet connected to the fluid passage and configured to discharge fluid to a downstream portion of the fluid passage;
a common central axis defined through the fluid passage, the inlet, and the outlet;
a resonating volume defined between the inlet and the outlet and along the common central axis, the inlet and the outlet being in fluid communication via the resonating volume, wherein an axial direction and a radial direction are defined relative to the common central axis, and wherein the resonating volume is configured to vary as a function of a volume of an inflatable member located inside the tunable resonator, the inflatable member extending axially and circumferentially relative to the common central axis, the inflatable member having a means for varying the volume by expanding or retracting the inflatable member, the inflatable member connected to a fluid source for varying the volume of the inflatable member, wherein the resonating volume is fluidly disconnected from the volume of the inflatable member, the inflatable member thereby configured to tune the resonating volume to a selected frequency of pressure fluctuations or acoustic waves within the fluid passage.

2. The gas turbine engine according to claim 1, wherein the resonating volume varies inversely to the volume of the inflatable member.

3. The gas turbine engine according to claim 1, wherein the inflatable member comprises two inflatable sub-members, the two inflatable sub-members each covering a portion of at least one inner wall of an outer casing of the tunable resonator.

4. The gas turbine engine according to claim 1, wherein the means for varying the volume is a skin of the inflatable member, the skin having at least one gusset, the at least one gusset having two sections pivotable relative to one another along an edge joining the two sections, an angle between the two sections variable with a change of volume of the inflatable member.

5. The gas turbine engine according to claim 4, wherein the skin has a plurality of gussets, the plurality of gussets defining an accordion section of the skin of the inflatable member.

6. The gas turbine engine according to claim 1, wherein the inflatable member, in one or more inflated positions, extends axially and radially relative to the axial and radial directions of the tunable resonator, the inflatable member configured to expand or retract in both the radial direction and the axial direction.

7. The gas turbine engine according to claim 1, wherein the inflatable member is located axially between the inlet and the outlet.

8. The gas turbine engine according to claim 1, wherein the inflatable member extends fully circumferentially around the common central axis.

9. The gas turbine engine according to claim 1, wherein the inflatable member extends or retracts in the axial direction and/or the radial direction relative to the common central axis.

10. The gas turbine engine according to claim 1, wherein a first of the at least two components is a scoop in fluid flow communication with an annular by-pass conduit of the gas turbine engine.

11. The gas turbine engine according to claim 10, wherein the inflatable member of the tunable resonator expands and retracts at least in the radial direction relative to the common central axis, the tunable resonator having a first configuration in which air can flow through the tunable resonator and a second configuration in which the inflatable member blocks air from flowing through the tunable resonator.

12. The gas turbine engine according to claim 10, wherein a second of the at least two components is a case of a turbine section of the gas turbine engine.

13. The gas turbine engine according to claim 1, wherein the inflatable member of the tunable resonator expands and retracts at least in a radial direction relative to the central axis.

14. The gas turbine engine according to claim 3, wherein each of the two inflatable sub-members extending around a portion of a circumference around the central axis.

15. The gas turbine engine according to claim 14, wherein the two inflatable sub-members encircle the resonator passage.

* * * * *